June 7, 1960 E. D. HOBSON 2,939,481
MEANS FOR EMPTYING LIQUID FROM TANKS
Filed June 4, 1957

INVENTOR
Eric D. Hobson
BY
Watson, Cole, Grindle & Watson
ATTORNEYS

United States Patent Office 2,939,481
Patented June 7, 1960

2,939,481

MEANS FOR EMPTYING LIQUID FROM TANKS

Eric Dott Hobson, Shandon, Scotland, assignor to Yarrow and Company Limited, Glasgow, Scotland, and Andre Rubber Company, Limited, Surbiton, England, jointly Filed June 4, 1957, Ser. No. 663,484

Claims priority, application Great Britain June 11, 1956

5 Claims. (Cl. 137—590)

This invention relates to means for facilitating the emptying of liquid from tanks.

The invention is particularly adapted for use with tanks which, after being emptied of one liquid, are adapted to be filled with a different liquid, for example, ships' oil fuel tanks which, when the oil has been removed, are filled with water for ballasting purposes. In such case it is important that all the first liquid be pumped out of the tank before it is refilled with the second liquid to avoid as far as possible the latter liquid being contaminated by residue of the first liquid.

In the case of oil/water ballast tanks, the liquids namely oil and water will have different specific gravities and as there will inevitably be some residue of one or other liquid left in the tank when it is refilled, this residue will either settle to the bottom of the tank or form a scum on the surface of liquid with which the tank is refilled. For example if a tank is filled with ballast water after being emptied of fuel oil, the residue of oil, that remained in the tank will form a scum on the surface of the water, the main body of the water will, however, be uncontaminated and suitable for discharge overboard when the tank is to be emptied. If, however, turbulence is set up during the emptying of the tank the scum will be mixed with water and the whole contents be contaminated with oil to an extent that would prevent it being pumped overboard, as there are stringent government regulations prohibiting the discharge of oil or oil contaminated liquid.

It would accordingly be necessary to pass the whole contents of the tank through an oil/water separator to remove the oil before it could be pumped overboard.

It is an object of the present invention to provide means whereby a tank may be emptied substantially completely dry of liquid without setting up turbulence such as would cause any scum on the surface to contaminate the main body of the liquid.

According to the present invention a suction chamber is provided in the tank from which the liquid is to be pumped out, the chamber being located on the floor of the tank and having means for connecting it with a suction pipe, the suction chamber including a wall extending upwardly from the tank floor and having at least one elongated opening formed in its lower edge, a flexible membrane being provided covering said opening, the lower edge of the membrane being disposed in closely spaced relation to the tank floor and being unsecured and free to flex inwardly of said opening to provide an elongated narrow gap for liquid to flow from the tank into the suction chamber.

The suction chamber preferably extends completely across the floor of the tank, and if the tank is divided into partitioned compartments at least one elongated opening is located in each compartment so that the suction chamber forms a common sump for drawing liquid from all the compartments.

The arrangement is such that when the chamber is under suction the different pressures created on opposite sides of the flexible curtain will cause the latter to flex inwardly so that its lower edge will be lifted and permit the entry of liquid from the tank into the suction chamber, from whence it is readily sucked into the pipe and discharged from the tank.

If the suction pipe is maintained under relatively powerful suction it will be possible to draw liquid at a high rate into the suction chamber with slight resistance to flow. When, due to the drop in level in the tank, some air is drawn into the chamber with the liquid, the drop in differential pressure will cause the inward flexing of the curtain to be reduced and accordingly the space between its lower edge and the base of the tank will be progressively reduced with the result that practically all the liquid in the tank can be drawn into the suction chamber and accordingly the tank can be pumped substantially dry.

The suction chamber may comprise a hollow member of rectangular, triangular, hemispherical or any other suitable shape, and preferably it is secured to the base of the tank at or near the lowermost part thereof, one or more openings each covered by a flexible curtain may be provided in one or more of the upstanding walls of the chamber.

To enable the invention to be fully understood it will now be described with reference to the accompanying drawing, in which.

Figure 1:
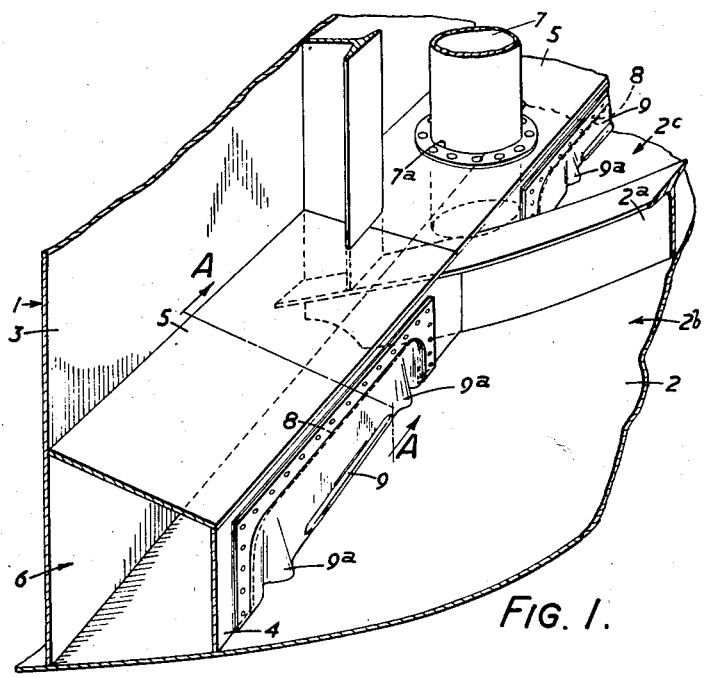
Fig. 1 is a fragmentary perspective view of a tank partly in section illustrating one embodiment of the invention.
Figure 2:
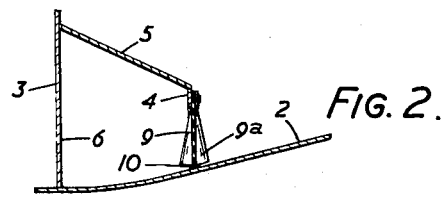
Fig. 2 is a side view taken on the line A—A of Fig. 1.

As shown in Figs. 1 and 2 of the accompanying drawing a tank 1, for example an oil/water ballast tank of a ship includes the floor 2 and the usual vertical walls only one of which, namely the wall 3, is shown.

Part of the area of the floor 2 adjacent to the wall 3 is partitioned off by means of a vertical wall member 4 which extends transversely of the tank, its opposite ends being secured, as by welding, to the opposite side walls (not shown) of the tank. One or more plates 5 are provided which slope upwardly from the wall 4 to the tank wall 3 and are secured for example by welding so that the wall 4, plates 5 and adjacent portions of the tank walls co-operate to form a box like chamber 6 which is adapted to form a suction chamber for a suction pipe to enable the tank to be emptied of liquid. A suction pipe 7 is connected with the chamber and extends through the opening 7a in the plate 5 so that its lower inner end opens into the chamber adjacent to the floor of the tank which constitutes the bottom of the said chamber.

The vertically extending wall 4 is formed with elongated openings 8 over each of which is secured a membrane or curtain 9 made of rubber, synthetic plastic or flexible material. According to one example the membrane or curtain is made of neoprene. The upper and side edges of the membrane are secured to the wall 4 adjacent to the edges of the opening 8 but the lower edge 10 is unsecured. The membrane is preferably formed with vertically extending corrugations or the like 9a for the purpose of imparting fullness. The edge 10 is disposed in closely spaced relation to the tank floor 2 so that the membrane in effect forms a flexible curtain covering the openings 8 and capable of flexing movement to cause the edge 10 to be raised from the floor 2 to permit liquid in the tank to flow into the chamber 6 as will hereinafter be described.

It will be noted that the tank is divided by the member 2a into compartments 2b, 2c and that the suction chamber extends through both compartments and an elongated opening 8 is located in each so that liquid can be drawn through the openings beneath the flexible membranes and be pumped out through the suction pipe 7.

Assuming that the tank 1 is filled with ballast water and is required to be emptied, the suction pipe 7 is placed under suction with the result that the pressure in the chamber 6 will be less than that in the main body of the tank on the outer side of the flexible membranes 9 and accordingly the latter will be flexed inwardly so that the lower edges 10 will be moved through an arc away from the floor of the tank to permit the flow of liquid from the tank into the suction chamber 6 from whence it is drawn up through the suction pipe and discharged. As membranes 8 are fully flexible the position of the free edges 10 relative to the floor of the tank will be automatically adjusted in accordance with the difference in pressure prevailing in the suction chamber and in the main body of the tank and as under normal conditions there will be provided a relatively narrow gap between the floor of the tank and the lower free edges 10 of the membrane 9, if the chamber is placed under suitable suction, it will be possible to draw all or substantially all the free liquid from the tank into the chamber.

The provision of elongated openings enables the liquid to be withdrawn in a steady stream over a considerable area of the tank, and while enabling a relatively high rate of flow to be maintained will not cause turbulence as the liquid is withdrawn as a relatively narrow stream through the openings. Accordingly any scum on the surface will remain as a surface layer and the main body of liquid can be emptied from the tank in an uncontaminated condition and in the case of ballast water, pumped overboard.

When the tank has been emptied to a degree that the level is approximately at the lower edge of the flexible curtain, air will be drawn into the suction chamber and as a result the pressures on the inner and outer sides of the curtain will be equalised, and the curtain will revert to its original vertical position thereby reducing the gap for the flow of liquid. The air will, however, assist the flow of the remaining liquid into the suction chamber as it will flow into the chamber at relatively high velocity and will have a sweeping effect tending to sweep the final residue of liquid into the chamber.

If desired a separate suction pipe may be provided at one end of the suction chamber connected at the lowest level thereof for removing the final residue of liquid including the scum, this residue being delivered to an oil/water separator. It will be understood, however, that this residue will be only a small part of the content of the tank and that the major portion of liquid, which will be uncontaminated, will be withdrawn through the pipe 7.

The pipe 7 may also be used for refilling the tank with water.

It will be understood that in the case wherein the tank is refilled with fuel oil after removal of water ballast, a layer of any residual water contaminated by or emulsified with fuel oil will separate, by gravity, from the fuel oil and collect at the base of the tank. This can be removed and discharged to a source of purification or storage so that only the uncontaminated oil content of the tank will be supplied to the point of use.

Normally a separate pipe will be provided for withdrawing the oil from the tank and it can also be used for refilling it with oil when required.

In addition to flexing inwardly the curtains are able to flex outwardly when the tank is being refilled.

Figure 4:
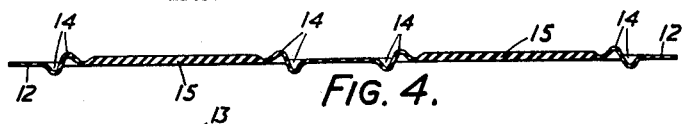
Fig. 4 is horizontal sectional view taken on line B—B of Figure 3.
Figure 3:
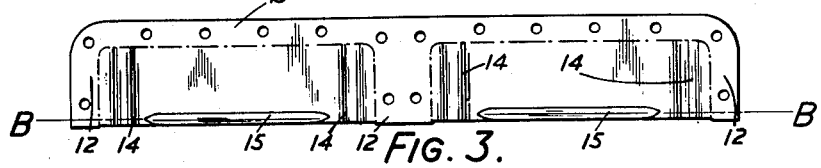
Fig. 3 is an elevation of a modified form of flexible membrane.

According to the modification illustrated in Figs. 3 and 4 a single membrane 11 is provided for covering two adjacently disposed elongated openings in the vertical wall. As shown the membrane includes a flat portion extending vertically and horizontally along the sides and upper edge 12, 13 which is adapted to be secured to the vertical wall such as 4 of the suction chamber adjacent to the edges of the two elongated openings. Adjacent to but spaced inwardly of the edge portions 12, the membrane is formed with double vertically extending corrugations 14 which serve to impart a fullness to the areas defined by the edge portions 12, 13 and thereby render said areas readily flexible to permit the lower free edges 15 of the membrane to flex inwardly in a manner similar to that referred to with reference to the free edge 10 of the membrane 9. In the modified embodiment the lower free edges 15 are provided with central horizontally extending stiffening ribs.

To assist the draining of liquid from the main body of the tank into the suction chamber, the floor of the tank may be arranged to slope towards the chamber as indicated in Fig. 2.

In the case of tanks located in ships, it is advantageous to provide a suction chamber along the opposite vertical side walls of the tank which run longitudinally of the ship so that the tank can be drained irrespective as to whether the ship is heeled to one or other side; the draining naturally will be effected through the suction chamber which happens to be at the lower level.

Instead of part of the suction chamber being formed by the lower portions of the vertical walls of the tank, the chamber or chambers may be formed as independent units including a pair of spaced vertical walls, opposed end walls, and a sloping top wall.

I claim:

1. A tank adapted to contain liquid, a suction chamber forming an integral part of said tank, a wall extending upwardly from the tank floor and forming part of said chamber, a suction pipe opening into said chamber, the said wall having at least one elongated opening having upper and opposed side edges defined by part of said wall and a lower edge defined by the floor of the tank, a flexible membrane secured to said upper and opposed side edges of said opening, and having a lower free edge disposed in closely spaced relation to the tank floor to provide an elongated narrow gap for liquid, and means for producing a predetermined amount of slack in at least the lower edge portion of said membrane, the flexibility of the said membrane being such that its said lower free edge is displaceable inwardly of the suction chamber to vary the width of said gap, as a result of a differential pressure with respect to opposed faces of said membrane.

2. A tank adapted to contain liquid, a rigid suction chamber forming an integral part of said tank, a suction pipe opening into said chamber, said chamber having a front wall extending upwardly from the tank floor the wall having a pair of elongated openings formed in its lower edge, a flexible membrane having an upper and opposed side edges secured to said wall so as to extend across both said openings, and having a lower free edge disposed in closely spaced relation to the tank floor such that medial portions of said free edge co-operate with the tank floor to define a pair of laterally spaced elongated narrow gaps for liquid to flow from the tank through said openings into the suction chamber, and means for producing a predetermined amount of slack in at least the lower free edge portion of said membrane, the flexibility of the said membrane being such that a reduction in pressure in said suction chamber relative to that in the tank results in inward flexing movement of the said membrane to increase the effective width of said gap.

3. A tank adapted to contain liquid, a rigid suction chamber forming an integral part of said tank, a suction pipe opening into said chamber, a front wall for said chamber extending upwardly from the tank floor, and formed with an elongated opening having an upper and opposed side edge defined by said wall and a lower edge defined by the tank floor, a flexible membrane secured to said upper and side edges of said opening so as to cover said opening, the membrane having a lower edge disposed in closely spaced relation to the tank floor to provide an elongated narrow gap for liquid to flow from the tank into the suction chamber, and means for producing a predetermined amount of slack in at least the lower free edge portion of said membrane, the flexibility of the said membrane being such that a reduction in pressure in said suction chamber relative to that in the tank results in inward flexing movement of the said membrane to increase the effective width of said gap.

4. A tank adapted to contain liquid, a suction chamber forming an integral part of said tank, a suction pipe opening into said chamber, a front wall for said chamber extending upwardly from the tank floor and formed with two laterally spaced elongated openings formed in its lower edge, a flexible membrane extending across each said opening, each membrane having an upper and opposed side edges secured to the corresponding edges of the respective openings and a free lower edge disposed in closely spaced relation to the tank floor to co-operate therewith to define a pair of laterally spaced elongated narrow gaps for liquid, and means for producing a predetermined amount of slack in at least the lower free edge portion of each said membrane such that the flexibility of each of said membranes will permit the said free edge portions to be displaceable relatively to said opening, so as to vary the width of said gaps, by the differential pressure acting on opposed faces of said membranes.

5. A tank adapted to contain liquid, a suction chamber forming an integral part of said tank, a wall extending upwardly from the tank floor and forming part of said chamber, a suction pipe opening into said chamber, said wall having at least one elongated opening having upper and opposed side edges defined by said wall and a lower edge defined by the floor of the tank, a flexible membrane secured to said upper and opposed side edges of the opening, and having a lower free edge disposed in closely spaced relation to the tank floor to provide an elongated narrow flow gap for liquid, vertically extending corrugations formed in said membrane so arranged that the flexibility of the said membrane is such that its said lower free edge is displaceable relatively to said opening to vary the width of said flow gap, by the difference in pressures on opposed faces of said membrane.

References Cited in the file of this patent

UNITED STATES PATENTS

| | | |
|---|---|---|
| 1,716,544 | Felton | June 11, 1929 |
| 2,193,466 | Raymond | Mar. 12, 1940 |
| 2,617,440 | Stephens | Nov. 11, 1952 |
| 2,746,477 | Krause | May 22, 1956 |